United States Patent
McGrath et al.

(10) Patent No.: US 10,946,763 B2
(45) Date of Patent: Mar. 16, 2021

(54) CHARGING OF AN ELECTRIC VEHICLE FLEET

(71) Applicant: Proterra Inc., Greenville, SC (US)

(72) Inventors: Seamus McGrath, Simpsonville, SC (US); Reuben Sarkar, Denver, CO (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 16/005,156

(22) Filed: Jun. 11, 2018

(65) Prior Publication Data

US 2018/0290546 A1 Oct. 11, 2018

Related U.S. Application Data

(63) Continuation of application No. 14/309,560, filed on Jun. 19, 2014, now Pat. No. 10,017,068.

(51) Int. Cl.
*H02J 7/00* (2006.01)
*B60L 58/12* (2019.01)
(Continued)

(52) U.S. Cl.
CPC ............ *B60L 58/12* (2019.02); *B60L 11/184* (2013.01); *B60L 53/11* (2019.02); *B60L 53/32* (2019.02);
(Continued)

(58) Field of Classification Search
CPC ............... B60L 11/184; B60L 11/1837; B60L 11/1844; B60L 11/1848; B60L 11/185; B60L 11/1861
(Continued)

(56) References Cited

U.S. PATENT DOCUMENTS 5,803,215 A 9/1998 Henze
5,926,004 A 7/1999 Henze
(Continued)

FOREIGN PATENT DOCUMENTS

CN 103 241 130 A 8/2013
EP 2 458 704 A1 5/2012
(Continued)

OTHER PUBLICATIONS

Lenain P. et al., "Monitoring Fleets of Electric Vehicles: Optimizing operational use and maintenance", Journal of Power Sources, Elsevier SA, CH, vol. 53, No. 2, Feb. 1, 1995; pp. 335-338.
(Continued)

*Primary Examiner* — Zixuan Zhou
(74) *Attorney, Agent, or Firm* — Bookoff McAndrews, PLLC

(57) ABSTRACT

A method for controlling the charging of multiple electric vehicles operating in a geographic area may include inputting a tariff schedule into a control system. The tariff schedule may identify the cost of energy at different times in the geographic area. The method may also include receiving data from the multiple electric vehicles. The data may include at least the state of charge of the vehicle. The method may further include sending instructions to at least one vehicle of the multiple electric vehicles. The instructions may include directives on charging based at least on the tariff schedule and the received data.

19 Claims, 5 Drawing Sheets

(51) Int. Cl.
*B60M 3/00* (2006.01)
*B60L 53/64* (2019.01)
*B60L 53/30* (2019.01)
*B60L 53/53* (2019.01)
*G06Q 50/06* (2012.01)
*B60L 53/63* (2019.01)
*B60L 53/55* (2019.01)
*B60L 53/66* (2019.01)
*B60L 53/68* (2019.01)
*B60L 53/10* (2019.01)
*B60L 11/18* (2006.01)
*G06Q 50/00* (2012.01)

(52) U.S. Cl.
CPC ............... *B60L 53/53* (2019.02); *B60L 53/55* (2019.02); *B60L 53/63* (2019.02); *B60L 53/64* (2019.02); *B60L 53/665* (2019.02); *B60L 53/68* (2019.02); *B60M 3/00* (2013.01); *G06Q 50/00* (2013.01); *G06Q 50/06* (2013.01); *B60L 2200/18* (2013.01); *B60L 2260/52* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
USPC .................................................. 320/103, 109
See application file for complete search history.

(56) References Cited

U.S. PATENT DOCUMENTS

| | | |
|---|---|---|
| 6,826,460 B2 | 11/2004 | Kittell et al. |
| 7,402,978 B2 | 7/2008 | Pryor |
| 7,778,746 B2 | 8/2010 | McLeod et al. |
| 2008/0281663 A1 | 11/2008 | Hakim et al. |
| 2011/0213656 A1 | 9/2011 | Turner |
| 2012/0112696 A1* | 5/2012 | Ikeda ............... B60L 53/14 320/109 |
| 2012/0280653 A1 | 11/2012 | Prosser |
| 2012/0303397 A1 | 11/2012 | Prosser |
| 2012/0330494 A1* | 12/2012 | Hendrix ............ B60L 11/1838 701/29.3 |
| 2013/0179057 A1 | 7/2013 | Fisher |
| 2013/0211988 A1* | 8/2013 | Dorn ................. G06F 1/26 705/35 |
| 2013/0221918 A1 | 8/2013 | Hill et al. |
| 2013/0311658 A1 | 11/2013 | Solomon |
| 2014/0028254 A1 | 1/2014 | Brooks et al. |
| 2015/0069970 A1 | 2/2015 | Sarkar |
| 2016/0247106 A1 | 8/2016 | Dalloro |

FOREIGN PATENT DOCUMENTS

| | | |
|---|---|---|
| KR | 2013 0076743 A | 7/2013 |
| WO | WO 2013/045449 A2 | 4/2013 |
| WO | WO 2014/078456 A1 | 5/2014 |

OTHER PUBLICATIONS

Extended European Search Report in Application EP 15172411.9 dated Oct. 20, 2015 (7 pages).

* cited by examiner

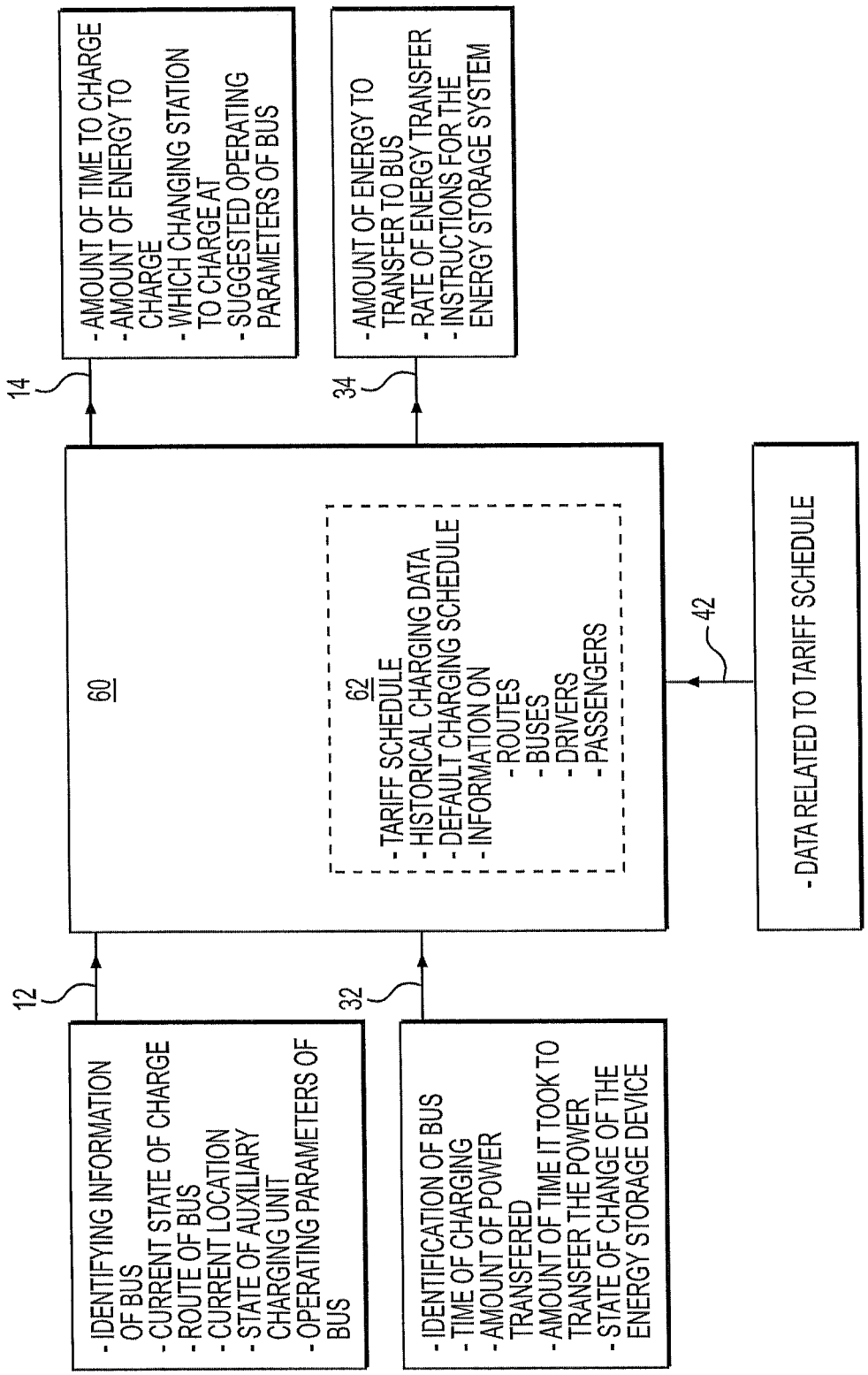

CHARGING OF AN ELECTRIC VEHICLE FLEET

CROSS-REFERENCE TO RELATED APPLICATIONS

This application is a continuation of U.S. application Ser. No. 14/309,560 filed on Jun. 19, 2014, which is incorporated by reference in its entirely herein.

TECHNICAL FIELD

The current disclosure relates to systems and methods of charging a fleet of electric vehicles. In particular, the current disclosure relates to a control system that controls the charging of electric vehicles of a fleet based on prevailing utility rates and the existing charge in the vehicles.

BACKGROUND

An electric vehicle (EV), also referred to as an electric drive vehicle, uses an electric motor (or traction motor) for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external power supply. Although the current disclosure is applicable, without limitations, to any type of electric vehicle, an exemplary case of an electric bus will be described to illustrate the features of the disclosed system.

For a given weight of the bus, the number, chemistry, and architecture of the battery assembly may determine the distance the bus can travel between recharges (range) and the time it takes to recharge the batteries (recharge time). For some applications, (for example, transit buses) where quick charging is important, fast-charge battery systems may be employed. Fast-charge batteries may store a relatively small amount of charge, but may be charged to substantially full capacity quickly. Battery system architecture may also allow fast charging of non-fast charge batteries. Some exemplary fast-charge battery systems suitable for an electric bus are described in commonly assigned U.S. Pat. No. 8,453,773 which is incorporated herein by reference in its entirety.

Because the range of a fast-charge electric bus is low, these buses are typically recharged along its route. In some applications, charging stations may be provided at a bus stop or another layover location to recharge the bus without inconveniencing passengers. At these charging stations, the electric bus couples with an arm or other mechanism of the charging station to direct external electric power to the bus to recharge the batteries. Typically, the cost of energy in a geographic area (city, county, etc.) varies as a function of, among other factors, the season (summer, winter, etc.), time of day (peak time, off-peak time, etc.), the rate of energy consumption (power), etc. When a fleet of electric buses operate in the area, energy cost may be a substantial portion of the total operating cost of the buses. Significant savings in energy cost may be achieved by controlling the recharging of the buses in the fleet based on the energy rates and the state of charge of all the buses in the fleet.

SUMMARY

Embodiments of the present disclosure relate to, among other things, systems and methods for controlling the charging of one or more electric vehicles. Each of the embodiments disclosed herein may include one or more of the features described in connection with any of the other disclosed embodiments.

In one embodiment, a method for controlling the charging of multiple electric vehicles operating in a geographic area using a control system is disclosed. The method may include inputting a tariff schedule into the control system. The tariff schedule may identify the cost of energy at different times in the geographic area. The method may also include receiving, using the control system, data from the multiple electric vehicles. The data may include at least the state of charge of the vehicle. The method may also include sending instructions from the control system to at least one vehicle of the multiple electric vehicles. The instructions may include directives on charging based at least on the tariff schedule and the received data.

In another embodiment, a method of controlling the charging of a fleet of electric buses using a control system is disclosed. The method may include inputting a tariff schedule into the control system. The tariff schedule may identify the cost of energy at different times. The method may also include receiving using the control system, data from a plurality of electric buses of the fleet. The data may include at least the state of charge of the plurality of electric buses. The method may further include receiving using the control system, data related to charging from one or more charging stations. The one or more charging stations may be configured to charge the fleet of electric buses. The method may additionally include sending instructions from the control system to at least one electric bus of the plurality of electric buses. The instructions may include directives related to charging based on at least the tariff schedule and the received data from the plurality of electric buses.

In yet another embodiment, control system for controlling the charging of a fleet of electric vehicles operating in a geographic area is disclosed. The control system may include a computer system configured to receive a tariff schedule. The tariff schedule may identify the cost of energy at different times in the geographic area. The control system may also include a receiver configured to wirelessly receive data related to state of charge from multiple vehicles of the fleet of electric vehicles, and a processor configured to determine a charging strategy based on at least the tariff schedule and the received data. The control system may further include a transmitter adapted to wirelessly transmit directives based on the determined charging strategy to at least one vehicle of the multiple vehicles.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 2B is an illustration of the data sent to and from the control system of FIG. 2A;

DETAILED DESCRIPTION

The present disclosure describes a control system and a method of controlling the charging of a fleet of electric buses to reduce utility cost. While principles of the current disclosure are described with reference to an electric bus, it should be understood that the disclosure is not limited thereto. Rather, the systems and methods of the present disclosure may be used to control the charging of any fleet of electric vehicles (taxis, etc.).

Figure 1:
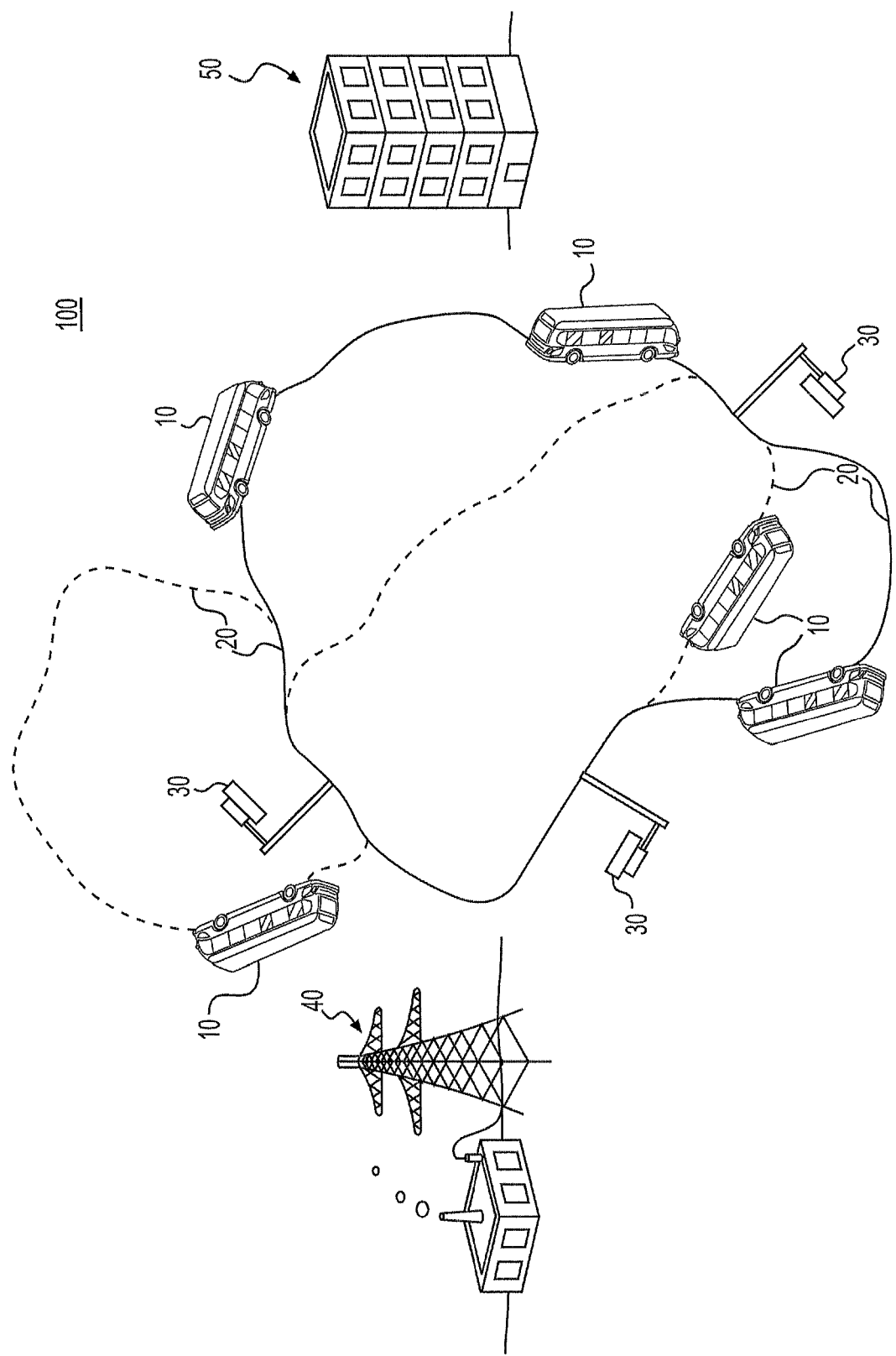
FIG. 1 is a schematic illustration of a fleet of electric buses operating in a geographic area.

FIG. 1 is a schematic illustration of a fleet of electric buses 10 operating along several routes 20 in a geographic area 100. Geographic area 100 may include any area (airport, university campus, city, town, county, etc.) that can be serviced by a fleet of electric buses 10. The fleet may include any number of electric buses 10. The fleet of buses 10 may be operated by an authority 50 (transport authority, airport authority, metro authority, etc.). One or more charging stations 30 may be positioned along the different routes 20 to charge the buses 10 that operate on these routes 20. The charging stations 30 may be coupled to an electric grid that is supplied with energy (electricity) by a utility company 40 that services the geographic area 100. When a bus 10 pulls up to a charging station 30, an interconnection mechanism of the charging station 30 couples with charging electrodes of the bus 10 to charge the batteries of the bus 10. After charging the batteries to a desired level, the bus 10 decouples from the interconnection mechanism and proceeds along its route 20. When the charge of the bus 10 decreases below a predetermined value, the bus 10 pulls into the same or a different charging station 30 to get recharged. The charging stations 30 may be positioned such that they service the buses 10 operating on several different routes 20.

Electric bus 10 may include a charging interface that couples with the interconnection mechanism of the charging station 30 to transfer electric power to the batteries. Without limitation, the bus 10 may include any type of charging interface that is adapted to couple with the interconnection mechanism. In some embodiments, the charging interface may be provided on the roof or another external surface of the bus 10. As the bus 10 stops at the charging station 30, the interconnection mechanism may advance towards (in some embodiments, swing over and descend towards) and couple with the charging interface on the roof to charge the bus 10. Some possible embodiments of charging interfaces and charging stations 30 are described in commonly-assigned patents/applications: U.S. Pat. No. 8,324,858; and International Application Publication Nos. WO/2011/079215, WO/2011/079215, and WO/2011/139680 which are incorporated by reference in their entirety herein.

In some embodiments, bus 10 may also include an on-board charging device to charge the batteries. The on-board charging device may include an auxiliary power generation device (such as, an internal combustion engine or a fuel cell) that generates supplemental power to charge the batteries when desired (such as when the bus is not close to a charging station 30). In some embodiments, one or more of the charging stations 30 may include an energy storage device 35 (capacitor, battery, etc.) electrically coupled thereto. Energy from the electric grid may be used to charge the energy storage device 35 when the energy cost is lower, and this stored energy may be used to charge a bus 10 when the energy cost is higher. Some possible embodiments of such energy storage devices are described in commonly-assigned U.S. Provisional Patent Application No. 61/876,698 (titled Methods and Systems for Electric Vehicle Charging) filed Sep. 11, 2013, which is incorporated by reference in its entirety herein.

The utility company 40 may charge the authority 50 for the energy consumed in charging the buses 10 based on a prevailing tariff schedule. The tariff schedule documents the cost per unit of electricity (for example, $/kilo Watt) as a function of several factors. These factors may vary with the geographic area 100, and often includes variables such as the season, time of use, rate of energy consumption, total energy consumed, voltage, etc. Typically, energy cost is higher when the demand for energy is higher (for example, Summer months, and times between 8 AM-10 AM, 4 PM-6 PM, etc.) and lower when the demand is lower (for example, Winter months, and at times between 10 AM-4 PM and 6 PM-8 AM). For a commercial consumer, the energy cost may follow a tiered approach. That is, the energy cost may change with the total power consumed. For example, total power consumption (per billing cycle) between 20 kilo Watts (kW) and 1 Mega Watt (MW) may be charged at a first rate, between 1-50 MW may be charged at a second rate, and above 50 MW may be charged at a third rate. The energy cost may also change as a function of the rate at which energy is consumed. For example, the cost for 100 kWhr of energy may be higher if this amount of energy were consumed in one unit of time (unit of time=1 minute, 15 minutes, 30 minutes, etc.) than if it were consumed over a longer time period (for example, in two units of time). The utility company 40 may periodically revise the tariff schedule and communicate this revised schedule to authority 50 and other consumers. The tariff schedule may be digitally transmitted to, or a paper copy may be mailed to, the authority 50.

Figure 2A:
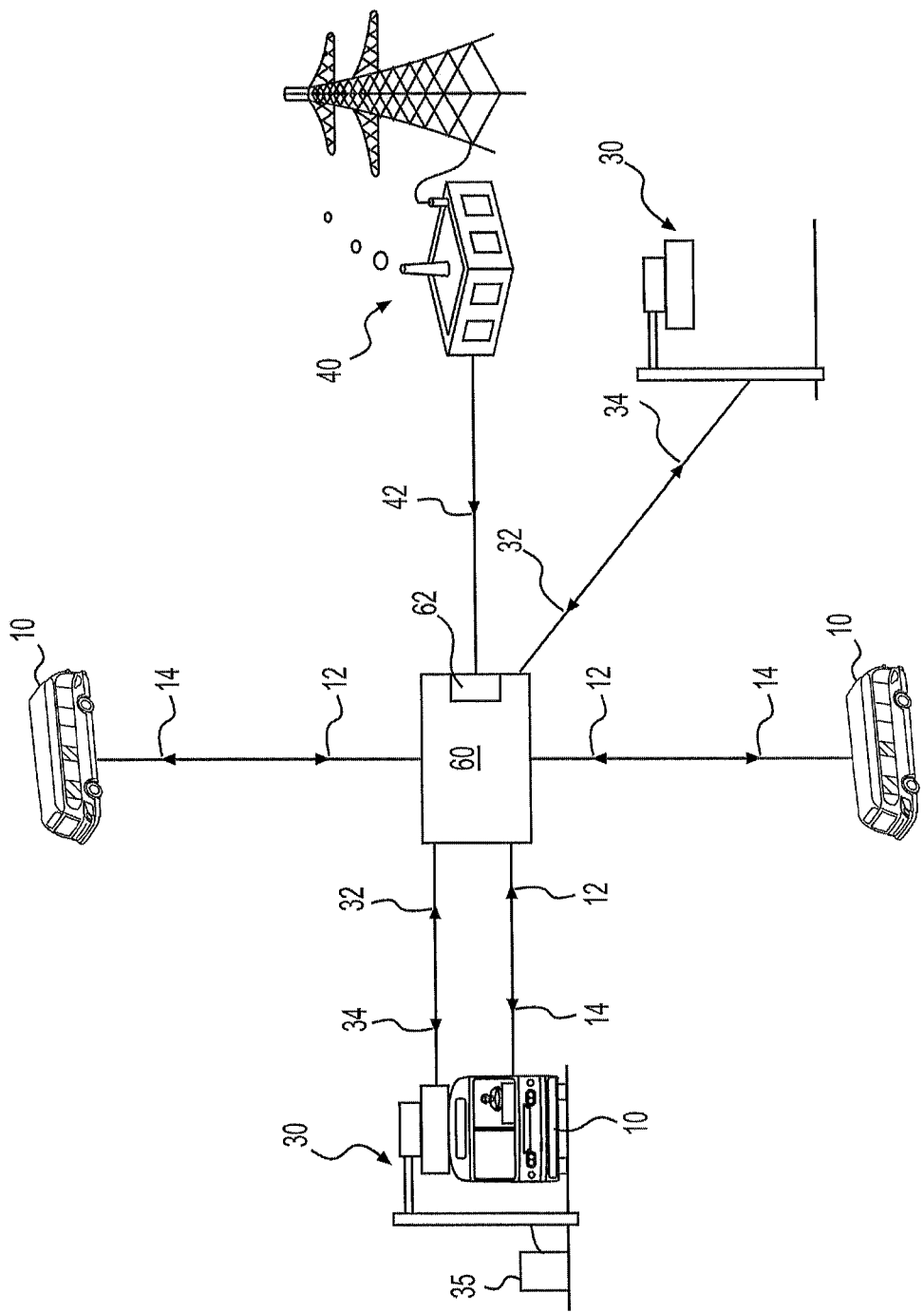
FIG. 2A is an illustration of an exemplary control system that controls the charging of the electric buses of FIG. 1.

The authority 50 may operate a control system 60 that controls the charging of the buses 10 based upon the tariff schedule. FIG. 2A schematically illustrates the control system 60 that controls the charging of the electric buses 10 operating in geographic area 100. The control system 60 may be positioned at any location (or multiple locations) and include one or more computer systems (or connected electronic devices) networked together over a wired or wireless network. In some embodiments, control system 60 may reside in one or more computer servers in the offices of the authority 50. In some embodiments, the control system 60 may be located at a charging station 30 or at another remote site. The control system 60 may be configured to receive data from, among others, the buses 10, charging stations 30, the utility company 40, and the authority 50. The control system 60 may also be configured to store data, perform computations, and relay data and/or instructions to the buses 10 and the charging stations 30. The control system 60 may be configured to receive data wirelessly and/or over a wired network. The control system 60 may also include input devices (such as, for example, key boards, disk/CD/DVD readers, memory card readers, etc.) configured to input data into the control system 60, and output devices (display devices, printers, disk/CD/DVD/memory card writers) configured to output data and information. The control system 60 may also be configured to store data 62 and other information, and perform computations on the stored and received data.

The data 62 stored in the control system 60 may include the prevailing tariff schedule in geographic area 100. Data 62 may also include, among others, information regarding the routes 20, buses 20, drivers, and the passengers. Information regarding the routes 20 may include GPS locations of the different routes 20, bus schedules (bus times along different routes), distance between stops along the route 20, location of charging stations 30 along the routes 20, etc. Information regarding the buses 10 may include bus identifying information, expected energy consumption of different buses (for example, based upon historic energy consumption (miles/KWhr) data, the age, and state of repair of the bus), etc. Information regarding the drivers may include the driving habits of the drivers based on historical data. And, information regarding the passengers may include historical data on the expected number of passengers at different stops along a route 20 at different times.

In some embodiments, the data 62 stored in the control system 60 may include a default charging schedule for the buses 10. That is, based on information of the route 20 and the buses 10 that operate on the route 20, the control system 60 may determine a default charging schedule for the buses 10. The default charging schedule may be any schedule that identifies when each bus 10 in the fleet will be charged. In some embodiments, the default charging schedule may include charging the bus 10 at the beginning or the completion of a route 20. That is, a bus 10 operating on a repeated fixed route may charge at a charging station at the beginning or the end of the route. In some embodiments, the default charging schedule may include charging a bus 10 at every charging station 30 it passes by. In some embodiments, the control system 60 may periodically revise or modify the default charging scheme based on historical data. For example, knowing that a particular bus can travel a certain distance between charges (based on historic miles/KWhr data), the control system 60 may adjust the default charging schedule of the bus to minimize energy consumption cost.

The control system 60 may receive data from and send instructions to the buses 10 and/or the charging stations 30 in geographic area 100. FIG. 2B illustrates the data received by and the instructions send by control system 60. Each electric bus 10 operating in the geographic area 100 may transmit data 12 to the control system 60. And, each charging station 30 in the geographic area 100 may transmit data 32 to the control system 60. A bus 10 may send data 12 to the control system 60 wirelessly or through a wired connection. In some embodiments, a bus 10 may wirelessly transmit data 12 periodically. In some embodiments, the bus 10 may transmit to and/or receive data from the control system 60 when it docks with a charging station 30. The data 12 transmitted by a bus 10 may include, among others, identifying information of the bus 10 and driver, current state of charge (SOC) of the bus 10, the route 20 of the bus 10, the state of auxiliary charging unit (if any) on the bus 10, and the current location of the bus 10. The SOC of the bus 10 may indicate the available charge (50% of full charge, etc.) on the bus 10 at any particular time. Based on this data 12 and stored data 62, the control system 60 may estimate the SOC of the bus 10 when it reaches the next charging station 30 along its route. Data 12 may also include the current operating parameters (such as, speed, load, etc.) of the bus 10. Based on the operating parameter data, the control system 60 may determine the rate of energy consumption of the bus 10 to get a better estimate of the SOC when the bus 10 reaches the next charging station 30.

Control system 60 may also transmit instructions 14 to the bus 10. These instructions 14 may include, for example, the amount of time to charge at a charging station 30, the amount of energy to recharge, the charging station 30 to charge at, etc. In some embodiments, instructions 14 may also include instructions to skip a charging event, delay charging until after a certain time, or to proceed to a different charging station 30 in the same or a different route 20. These instructions 14 may also include suggested operating parameters (such as, speed, etc.) to conserve energy to extend the range of the bus 10. In some applications, the control system 60 may also reroute a bus 10 to a charging station 30 that is not along its normal route 20.

The data 32 transmitted from the charging stations 30 may include details of charging of a bus 10. These details may include, for example, identification of the bus 10 that is being charged, the time of charging, amount of power transferred to the bus 10, amount of time it took to transfer the power, rate of charging, etc. Data 32 from charging stations 30 may also include information concerning the energy storage device 35, such as, the state of charge of the energy storage device 35. In some embodiments, the data may be transmitted real time, while in other embodiments, the data may be transmitted only periodically.

The control system 60 may also transmit instructions 34 to the charging stations 30. These instructions 34 may include the amount of energy to transfer to a bus 10, and the rate of energy transfer. For instance, to reduce the total amount of energy consumed in a time window, the control system 60 may send instructions 34 to the charging station 30 (and/or to the bus 10) to delay charging a bus 10, to decrease the rate of energy transfer, or to charge a bus 10 using the energy storage system 35 associated with the charging station 30. Charging a bus 10 using the energy storage system 35 may avoid increasing the total rate of energy consumption. Further, since energy is stored in the energy storage system 35 at times of lower energy cost, charging a bus 10 at times of higher energy cost using this lower cost stored energy may reduce the total energy cost. In some embodiments, the control system 60 may instruct a charging station 30 not to charge a because another bus that is coming to charge may need recharging more critically.

The utility company 40 may update the control system 60 with data 42 related to revised tariff schedules and energy costs. This data 42 may be communicated to control system 60 wirelessly, or over a wired network. It is also contemplated that this data 42 is manually input into the control system 60 from a tariff schedule or other cost information mailed to authority 50.

In some embodiment, control system 60 may also receive information such as traffic information and weather information. This information may be received from any source. In some embodiments, the buses 10 may provide data related to the weather and/or traffic to the control system 60. In some embodiments, the control system 60 may receive weather related data from the weather bureau and traffic related data from the Department of Transportation. It is also contemplated that, the control system 60 may receive weather and/or traffic information from private aggregators that provide live traffic and/or weather updates. The control system 60 may modify the default charging schedule based on the weather and/or traffic data.

Figure 3A:
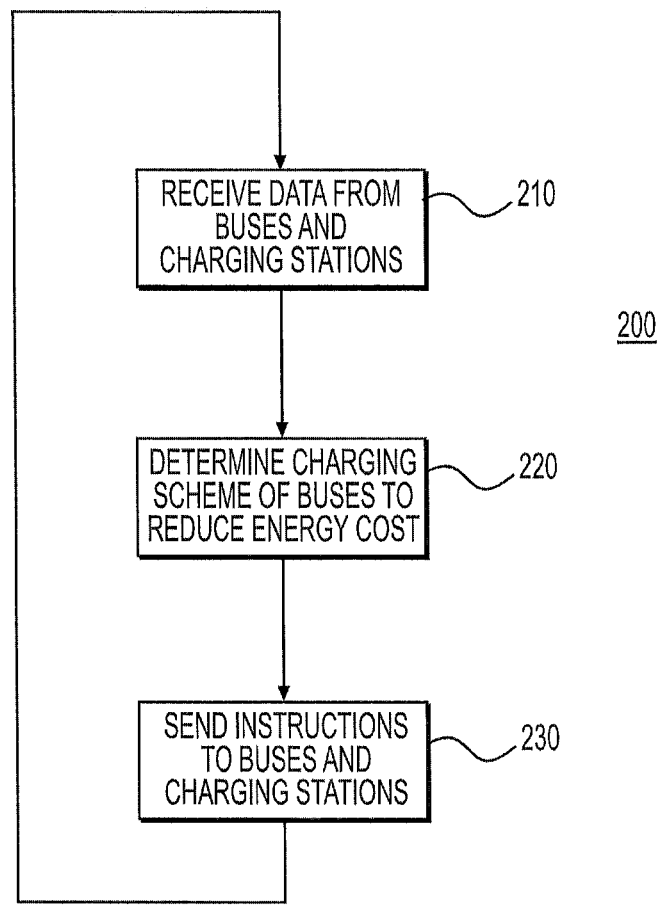
FIG. 3A is a flow chart that illustrates an exemplary operation of control system of FIG. 2A.

FIG. 3A is a flow chart that illustrates an exemplary operation 200 of control system 60. The control system 60 may receive data 12 from multiple (or in some embodiments, all) buses 10 operating in a geographic area 100 and data 32 from multiple charging stations 30 in the geographic area 100 (step 210). Based on this data 12, 32 (and the prevailing tariff schedule), the control system 60 may develop a charging scheme for the buses 10 to reduce total energy cost (step 220). The control system 60 may then send instructions 14, 34 to the buses 10 and/or the charging stations 30 to charge the buses 10 in a manner that reduces total energy cost without sacrificing operational reliability (step 220). For example, in some geographic areas 100, the cost per unit of energy is lower (for e.g., $0.1) when the rate of energy consumption (typically measured as the total energy consumption within a fixed time period, for e.g., 15 minutes) is below a certain value, and higher (that is, >$0.1) when the rate of energy consumption is above this value. In some geographic areas 100, the peak rate of energy consumption in a billing cycle may be used to calculate the total energy cost for the entire billing cycle. For example, if once during the billing cycle, the rate of energy consumption was 3 times the average rate for the rest of the billing cycle (for example, multiple buses charging within a 15 minute time window), the total energy cost for the entire billing cycle may be calculated at a higher rate. In such circumstances, the control system 60 may instruct the buses 10 to stagger their charging times so that multiple buses 10 do not charge at the same fifteen minute time window and increase the rate of energy consumption and total energy cost.

In some embodiments, the control system 60 may keep track of the energy consumption of the charging stations 30 in the geographic area 100. And, based on the received and stored data 12, 32, and 62, the control system 60 may determine the SOC of each bus 10 and the charging stations 30 each bus 10 has access to. The control system 60 may then send instructions 14, 34 to the buses 10 and/or the charging stations 30 to charge the buses 10 in a manner such that the overall energy cost is reduced. For example, at times of high energy cost, the control system 60 may determine if the charging of a bus 10 can be delayed to a time of lower energy cost without sacrificing operational efficiency. If it can, the control system 60 may instruct one or more buses 10 to cancel (or delay) a scheduled charging event and continue along its route 20 to the next charging station 30. In some embodiments, the instructions 14 from the control system 60 to the buses 10 may also include operating parameters to extend the range of the buses 10. In some embodiments, the control system 60 may reroute a bus 10 to a charging station 30 that is not along its normal route 20 if the available charge on the bus 10 is not sufficient to safely reach the next charging station 30 along its normal route 20.

In some embodiments, the SOC of multiple buses 10 may be such that the multiple buses 10 may need to charge at substantially the same time (for example, when their charging times are separated by less than or equal to 15 minutes). In some such embodiments, the control system 60 may instruct some of the buses 10 to proceed with charging as usual, and instruct one or more charging stations 30 to use their associated energy storage devices 35 to provide at least a portion of the energy to charge the buses 10. Since charging a bus 10 using an energy storage device 35 does not immediately draw energy from the electric grid, the rate of energy consumption may be lower. In some embodiments, the instructions to the charging station 30 may include directives to charge a percentage of the total energy from the energy storage device 35 and the remainder from the electric grid.

In some embodiments, the control system 60 may send instructions 14, 34 to the buses 10 and the charging stations 30 based on real-time data 12, 34 from the buses 10 and/or the charging station 30. In some embodiments, based on periodic data 12, 34 from the buses 10 and the charging stations 30, the control system 60 may develop a charging schedule for the buses 10 operating in the geographic area 100. The charging schedule may indicate when (time, etc.), where (charging station location, etc.), and the amount of energy each bus 10 in the fleet may charge. The control system 60 may then periodically revise the charging schedule based on received data 12, 34.

Figure 3B:
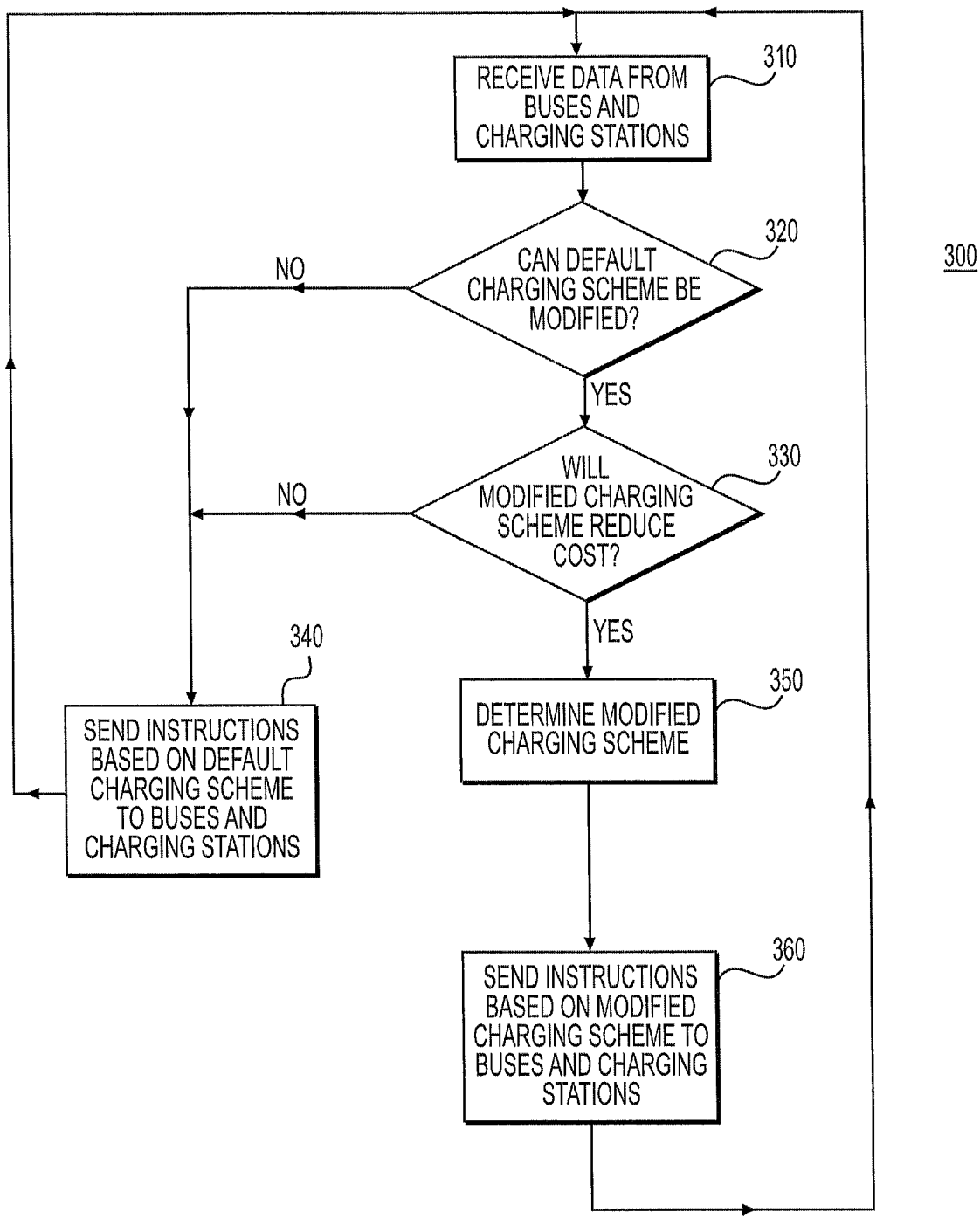
FIG. 3B is a flow chart that illustrates another exemplary operation of control system of FIG. 2A.

FIG. 3B is a flow chart that illustrates another exemplary operation 300 of control system 60. The control system 60 may receive data 12, 32 from the buses 10 and charging stations 30 in the geographic area 100 (step 310). The control system 60 may include a default charging scheme for the buses 10 as stored data 62 therein. Based on the received and the stored data, the controls system 60 may determine if the default charging scheme for a bus 10 can be modified (step 320). That is, the control system 60 may determine if there is any opportunity in reducing energy cost by modifying the charging scheme. For instance, if the SOC of a bus 10 and/or the distance to the next charging station 30 is such that a charging event for the bus 10 cannot be postponed, control system 50 may decide that the default charging scheme of this bus 10 cannot be modified. If the default charging scheme cannot be modified (NO on step 320), the control system 60 may send instructions 14, 34 to the bus 10 and/or the charging station 30 to charge the bus 10 based on the default charging scheme (step 340).

If the default charging scheme can be modified (YES on step 320), the control system 60 may then determine if modifying the charging scheme will reduce cost (step 330). That is, the control system 60 may determine if the tariff schedule at that time is such that cost may be reduced by modifying the charging scheme of a bus 10. If cost can be reduced (YES on step 330), the control system 60 may modify the default charging scheme of the bus 10 to reduce cost (step 350), and send instructions consistent with the modified charging scheme to the bus 10 10 and/or the charging stations 30 (step 360). If modifying the charging scheme will not provide sufficient cost savings (NO on step 330), the control system 60 may send instructions 14, 34 based on the default charging scheme (step 340).

In some embodiments, to determine if modifying the charging scheme will reduce cost (step 330), the control system 60 may first develop multiple possible charging options based on the conditions at the time (for example, the SOC of the bus, the tariff schedule, etc.), and then determine if implementing any of these multiple charging options will reduce cost. If cost can be reduced (YES on step 330), the control system 60 may modify the default charging scheme with the option that provides the most reduction in cost (step 350).

While principles of the present disclosure are described with reference to a fleet of electric buses, it should be understood that the disclosure is not limited thereto. Rather, the systems and methods described herein may be employed to manage recharging of any electric vehicle. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method for charging an electric vehicle of an electric vehicle fleet, comprising:
receiving, at a control system, data from multiple electric vehicles of the electric vehicle fleet, wherein the data is wirelessly transmitted from each electric vehicle of the multiple electric vehicles while in motion, the data including at least (a) a current location of the electric vehicle, and (b) a current state of charge of the electric vehicle; and determining, at the control system, based at least on the received data, (a) the state of charge of a first electric vehicle of the multiple electric vehicles when the first electric vehicle arrives for charging, and (b) an amount of energy to transfer to the first electric vehicle during the charging, wherein determining the amount of energy to transfer to the first electric vehicle includes determining the amount based on a total amount of energy that was previously transferred to the multiple electric vehicles during a time window.

2. The method of claim 1, wherein the determining further includes estimating a time at which the first electric vehicle will arrive for charging.

3. The method of claim 2, wherein the determining further includes estimating a rate of energy consumption of the first electric vehicle.

4. The method of claim 1, wherein the determining further includes determining a rate of energy transfer to the first electric vehicle during the charging.

5. The method of claim 1, wherein determining the amount of energy to transfer to the first electric vehicle includes determining the amount based on a cost of energy when the first electric vehicle is being charged.

6. The method of claim 1, wherein the data wirelessly transmitted from each electric vehicle of the multiple electric vehicles further includes a speed of the electric vehicle.

7. The method of claim 1, wherein the data wirelessly transmitted from each electric vehicle of the multiple electric vehicles further includes identification information of the electric vehicle.

8. The method of claim 1, wherein determining the amount of energy to transfer to the first electric vehicle includes selecting an amount of energy less than the amount needed to fully charge the first electric vehicle.

9. A method for charging an electric vehicle of an electric vehicle fleet, comprising:

receiving, at a control system, a tariff schedule, wherein the tariff schedule indicates a cost of energy at different times;

receiving, at the control system, data from multiple electric vehicles of the electric vehicle fleet, wherein the data is wirelessly transmitted from each electric vehicle of the multiple electric vehicles while in motion, the data from each electric vehicle including at least (a) information indicative of a charging schedule of the electric vehicle and (b) a current state of charge of the electric vehicle; and determining, at the control system, an amount of energy to transfer to a first electric vehicle of the multiple electric vehicles during charging based at least on (i) the state of charge of each electric vehicle of the multiple electric vehicles and (ii) the tariff schedule.

10. The method of claim 9, wherein the data from each electric vehicle further includes a current location of the electric vehicle, and wherein the determining further includes estimating a state of charge of the first electric vehicle when it arrives for charging.

11. The method of claim 10, further including calculating a total amount of energy that was previously transferred to the multiple electric vehicles in a time window.

12. The method of claim 11, wherein the determining further includes determining a rate of energy transfer to the first electric vehicle during the charging based on the calculated total amount of energy.

13. The method of claim 10, wherein determining the amount of energy to transfer to the first electric vehicle includes selecting an amount of energy less than the amount needed to fully charge the first electric vehicle.

14. The method of claim 10, wherein determining the amount of energy to transfer to the first electric vehicle is further based on information related to a subsequent charging event.

15. A control system for controlling the charging of an electric vehicle fleet, comprising:

a receiver configured to receive data from multiple electric vehicles of the electric vehicle fleet, wherein the data is wirelessly transmitted from each electric vehicle of the multiple electric vehicles while in motion, the data including at least (a) a current location of the electric vehicle, and (b) a current state of charge of the electric vehicle;

receiving data from one or more charging stations, wherein the data from each of the one or more charging stations includes at least a current state of charge of an associated energy storage device; and a processor configured to determine, based at least on the received data from the multiple electric vehicles and the one or more charging stations, (a) the state of charge of a first electric vehicle of the multiple electric vehicles when the first electric vehicle arrives for charging, and (b) an amount of energy to transfer to the first electric vehicle during the charging.

16. The control system of claim 15, wherein the processor is further configured to estimate a time at which the first electric vehicle will arrive for charging.

17. The control system of claim 15, wherein the processor is further configured to determine a rate of energy transfer to the first electric vehicle during the charging.

18. The control system of claim 15, wherein the processor is configured to determine the amount of energy to transfer to the first electric vehicle based additionally on a total amount of energy that was previously transferred to the multiple electric vehicles during a time window.

19. The control system of claim 15, wherein the processor is configured to determine the amount of energy to transfer to the first electric as an amount less than the amount needed to fully charge the first electric vehicle.

\* \* \* \* \*